June 8, 1948.  A. C. RUGE  2,442,938
FLUID PRESSURE RESPONSIVE APPARATUS
Filed Sept. 13, 1945
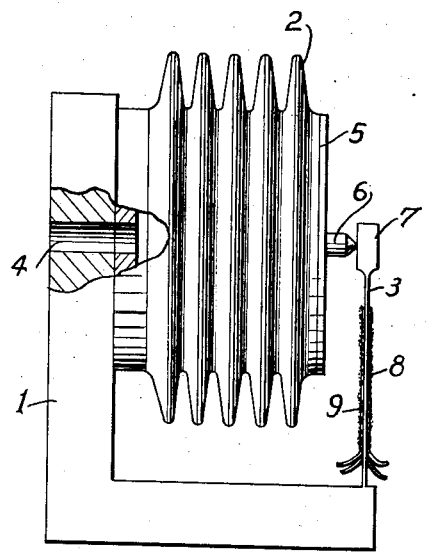
INVENTOR
Arthur C. Ruge
BY
ATTORNEY Patented June 8, 1948

2,442,938

UNITED STATES PATENT OFFICE 2,442,938

FLUID PRESSURE RESPONSIVE APPARATUS

Arthur C. Ruge, Cambridge, Mass., assignor to The Baldwin Locomotive Works, a corporation of Pennsylvania Application September 13, 1945, Serial No. 616,044

2 Claims. (Cl. 201—63)

1

This invention relates generally to fluid pressure sensitive devices of the type employing electrical strain sensitive pickups.

It is an object of my invention to provide an improved fluid pressure responsive device that is adapted in a relatively simple and economical manner to employ an electrical strain sensitive pickup so as to obtain a high degree of sensitivity and accuracy combined with ruggedness and stability.

Other objects and advantages will be more apparent to those skilled in the art from the following description of the accompanying drawing in which the figure is a side elevation of one form of my invention partly broken away to show details of construction.

As shown in the drawing, a relatively heavy L-shaped frame 1 supports a Sylphon type bellows 2 and a dynamometer consisting of a flexible cantilever type beam 3 extending radially with respect to the bellows axis. Fluid pressure is supplied to the interior of the bellows through a suitable inlet port 4 while the opposite closed end 5 of the bellows is provided with a point 6 engaging an upper enlarged end 7 of the beam 3. Thus the dynamometer is interposed between the base and bellows. Strain gages such as disclosed in Simmons Patent No. 2,292,549 are mounted preferably on both sides of beam 3 with the gage wire extending lengthwise thereof. These gages constitute arms of a Wheatstone bridge, as is well understood in the art, for measuring changes in the electrical resistance of the wire in accordance with deflection of beam 3 as fluid pressure varies within the bellows 2, the fluid pressure being supplied from any suitable source to be measured. This combination provides an extremely rugged device in that the frame 1 may be made heavy to support the beam 3 in operative relation to the bellows point 6 while at the same time allowing the beam to have any desired degree of flexibility and transverse rigidity. Such rigidity arises out of the fact that the beam is flat and might normally have a width about one-fifth its length although this as well as its thickness may vary in accordance with the sensitivity desired.

In my improved arrangement the bellows is employed in such a way that its own stiffness can be made to play a negligible part in the measurement inasmuch as its primary function is to transmit a force proportional to pressure to the load sensitive elements 3 and 18. For instance, if bellows 2 is somewhat inelastic as a free bellows, and should it expand and contract badly as a free bellows due to temperature change, it

2 is seen that if the load sensitive element 3 is made stiff relative to the stiffness of bellows 2 the force acting against element 3 will be influenced only to a very slight extent by the poor elastic properties of bellows 2 or by any tendency it has to change the dimensions with temperature. It will also be understood that in the figure the element 3 is shown in the form of a cantilever for purposes of illustration only and that any kind of load sensitive pickup may be used.

From the foregoing disclosure, it is seen that I have provided an extremely simple, sensitive and yet rugged fluid pressure responsive apparatus that is economical in construction, operation and maintenance.

It will of course be understood that various changes in details of construction and arrangement of parts may be made by those skilled in the art without departing from the spirit of the invention as set forth in the appended claims.

I claim:

1. Fluid pressure responsive apparatus comprising, in combination, a member having a rigid base, a fluid responsive Sylphon bellows with one end secured to said base and the other end freely movable, a strain sensitive cantilever beam one end of which is secured to said base and the other end of which is engageable with the freely movable end of said bellows, and the beam being so arranged as to extend at an angle to the direction of bellows movement, and electrical strain responsive means associated with said strain sensitive member whereby an electrical indication may be obtained in response to fluid pressure.

2. Fluid pressure responsive apparatus comprising, in combination a base, a fluid pressure element supported by said base adapted to have movement in response to fluid pressure, a strain sensitive member for resisting movement of said element, and electrical strain responsive means connected to said strain sensitive member so as to be responsive to strains therein resulting from its resistance to the fluid pressure responsive element.

ARTHUR C. RUGE.

REFERENCES CITED

The following references are of record in the file of this patent:

UNITED STATES PATENTS

| Number | Name | Date |
|---|---|---|
| 2,059,549 | Carlson | Nov. 3, 1936 |
| 2,316,203 | Simmons | Apr. 13, 1943 |
| 2,405,199 | Faust et al. | Aug. 6, 1946 |